United States Patent [19]

Stecker

[11] 4,271,986
[45] Jun. 9, 1981

[54] DRINK DISPENSER SPIGOT WITH SPLASH DEFLECTOR

[75] Inventor: Earl M. Stecker, Kiel, Wis.

[73] Assignee: Stoelting, Inc., Kiel, Wis.

[21] Appl. No.: 961,802

[22] Filed: Nov. 17, 1978

[51] Int. Cl.³ .............................................. B67D 3/00
[52] U.S. Cl. ................................... 222/151; 222/501; 222/518; 222/559; 137/536
[58] Field of Search ................ 222/148, 149, 151, 501, 222/559, 511, 509, 513, 514, 518; 137/536, 244

[56] References Cited

U.S. PATENT DOCUMENTS

| 1,837,552 | 12/1931 | Kelly | 222/511 |
| 2,240,030 | 4/1941 | Bobrick et al. | 222/148 UX |
| 2,345,081 | 3/1944 | Ward | 222/509 X |
| 3,200,994 | 8/1965 | Levinson et al. | 222/511 X |
| 4,095,727 | 6/1978 | Dorsch | 222/559 X |

FOREIGN PATENT DOCUMENTS

| 333117 | 8/1930 | United Kingdom | 222/559 |
| 951434 | 3/1964 | United Kingdom | 222/509 |

Primary Examiner—Robert J. Spar
Assistant Examiner—Frederick R. Handren
Attorney, Agent, or Firm—Wheeler, Morsell, House & Fuller

[57] ABSTRACT

A drink dispenser spigot comprises a barrel, a valve plunger, a stem for the plunger, and a spout opening in the barrel. A splash deflector collar about the stem is movable therewith. As the spigot is opened by withdrawing the plunger so that it passes over the spout opening to dispense drink, the splash deflector at least partially blocks splashing of the drink through the spout opening and into the barrel. Some drink splash may enter the barrel but the splash deflector has a wiper flange which will wipe interior surfaces of the barrel as the plunger moves toward closed position and wipe drink splash from the inside of the barrel and out through the spout opening.

2 Claims, 5 Drawing Figures

U.S. Patent  Jun. 9, 1981  4,271,986
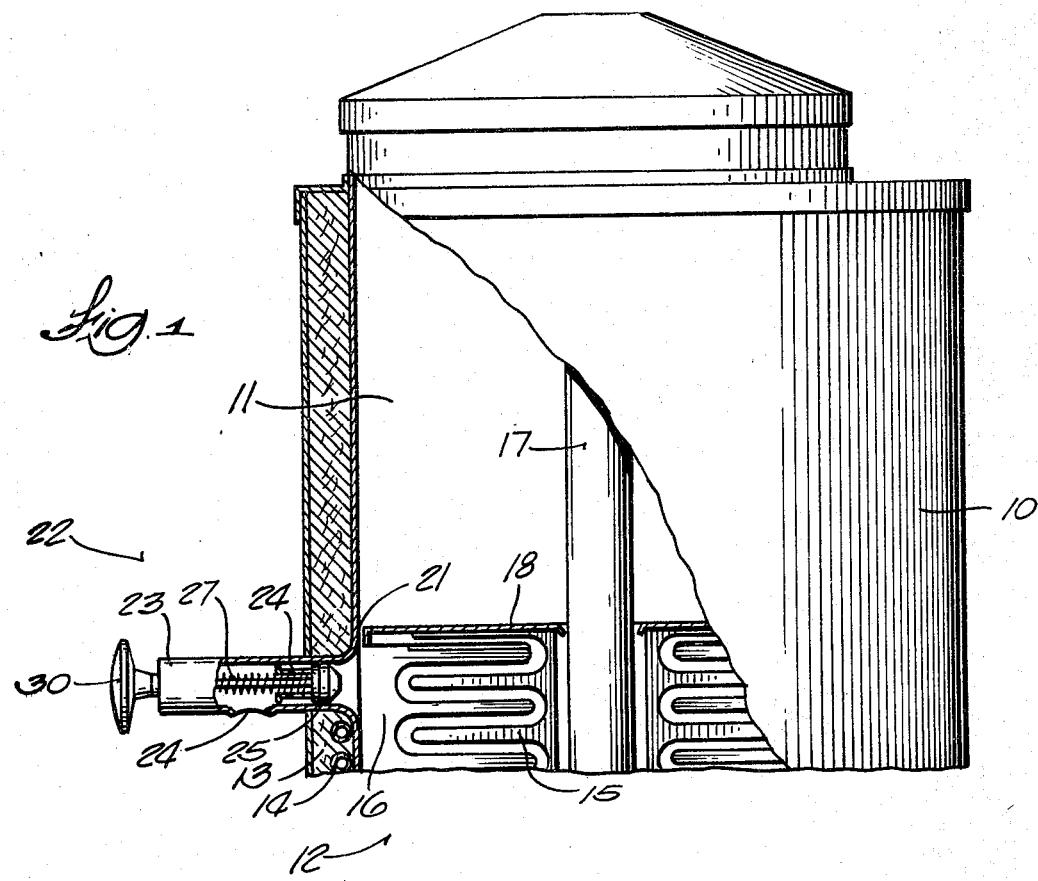
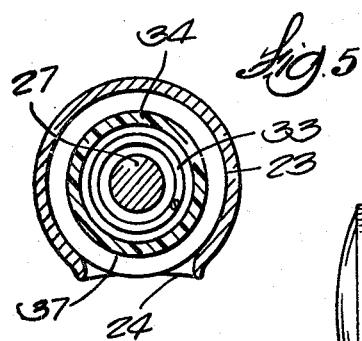
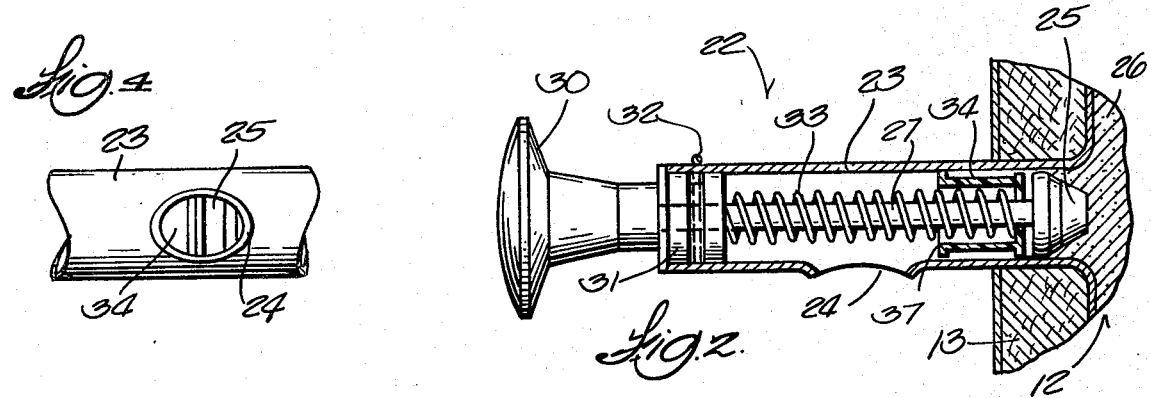
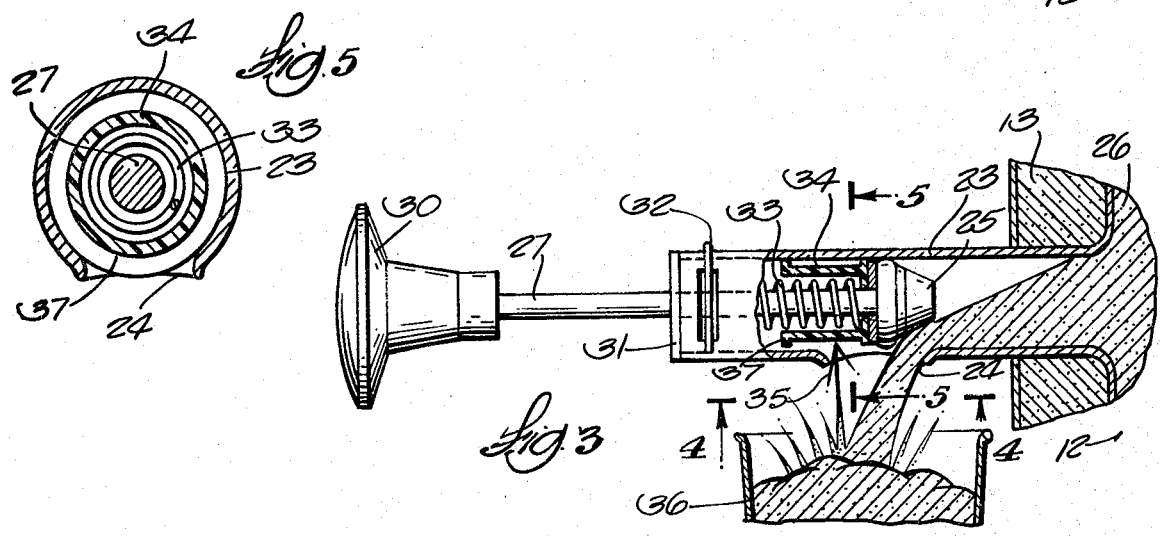

DRINK DISPENSER SPIGOT WITH SPLASH DEFLECTOR

BACKGROUND OF THE INVENTION

U.S. Pat. No. to Dunn 3,069,866 shows a typical prior art drink dispenser spigot. It does not have the splash deflector of the present invention. Accordingly, no provision is made in this prior art spigot for blocking the entry of drink splash into the spigot barrel when the plunger is opened, nor is any provision made for wiping such drink splash from the interior of the barrel out through the spout when the plunger is returned to its closed position. Accordingly, the prior art spigot is subject to being contaminated by drink splash which will accumulate in the barrel. Such drink is a sugary and sticky liquid which tends to dry out and gum up the mechanism, as well as constituting a source of contamination, thus requiring periodic disassembly, cleaning and maintenance of the spigot.

SUMMARY OF THE INVENTION

The splash deflector of the present invention largely blocks and prevents drink splash from entering the spigot barrel and also tends to wipe any remains of such drink splash that does not enter the barrel off of the barrel interior wall and out through the spout opening. Accordingly, accumulation of drink splash in the barrel is minimized, thus reducing contamination and reducing the need for periodic disassembly, cleaning and maintenance of the spigot.

In preferred embodiments, the splash deflector comprises a barrel or collar shield about the plunger stem. The deflector is attached to the stem to move therewith. Accordingly, as the plunger is withdrawn from its closed position to pass over the spout opening and dispense drink therefrom, the splash deflector will be disposed over the spout opening and in the path of drink splash. Thus, the deflector at least partially blocks such splash and keeps it from entering the barrel, except for that part of the barrel closely adjacent the spout opening. The deflector collar has a wiper flange at its end remote from the plunger in close proximity to the wall of the barrel. Accordingly, any drink splash that does enter the barrel and is deposited on the barrel wall will be subject to the wiping action of the flange as the plunger is returned to closed position, thus wiping such drink splash back out of the barrel through the spout opening.

Other features, objects and advantages of the invention will appear from the disclosure hereof.

DESCRIPTION OF THE DRAWINGS

FIG. 1 is a view partially in elevation and partially in cross section through a slush freezer having a dispensing spout embodying the present invention.

FIG. 2 is an enlarged cross section taken through the spout with the plunger in its closed position.

FIG. 3 is a cross sectional view similar to FIG. 2, but showing the plunger withdrawn to a drink dispensing position, a drink receiving cup being fragmentarily shown in this view.

FIG. 4 is a fragmentary bottom plan view of the spigot barrel. This view is taken in the direction of arrows 4—4 of FIG. 3.

FIG. 5 is a cross section taken along the line 5—5 of FIG. 3.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 is a fragmentary illustration of a slush freezing apparatus of the type generally shown in prior U.S. Pat. Nos. 3,069,866; 3,180,110; 3,698,203 and 4,084,407. The drink dispensed therefrom is commonly known as a slush drink, as more fully described in U.S. Pat. No. 3,069,866. It typically comprises a water based liquid containing a large number of ice particles and a sugary flavoring agent. Accordingly, splash from this drink will leave a viscous and sticky residue when its water content evaporates.

The slush freezing apparatus will not be described in detail inasmuch as such apparatus is well known and is fully described in the patents hereinbefore referred to. To the extent that it is illustrated in FIG. 1, the apparatus includes an upper liquid reservoir 11 and a lower freezing tank 12 within a housing 10. The wall of tank 12 comprises an insulated jacket 13 having freezing coils 14. Within the freezing tank 12 there are a series of interleaved fingers 15 and 16. These interact as described in the prior patents to stir the slush in the tank 12 and keep tank contents from freezing as a solid mass. There is a divider plate 18 separating the two chambers 11, 12. Divider plate 18 is spaced slightly from the wall of the tank to provide a gap 21 through which liquid from storage reservoir 11 can flow into the freezing chamber 12 where ice crystals are formed.

Dispenser spigot 22 comprises a barrel or tube 23 through the tank wall 13. Barrel 23 has a spout opening 24 at its undersurface. The barrel 23 provides a guideway for valve plunger 25 which closes the spigot 22 to retain the drink 26 in its tank 12 when the plunger valve 25 is in its closed position shown in FIG. 2.

Plunger 25 is attached to one end of stem 27 which has a handle 30 at its other end. Stem 27 passes through and is guided by a plug 31 which is held inside the outer end of the barrel 23 by snap ring 32, as is conventional and as is shown in more detail in FIG. 9 of Dunn U.S. Pat. No. 3,069,866.

Valve plunger 25 is biased to its closed position as shown in FIG. 2 by coil spring 33 which spans between the plunger 25 and the end plug 31. The barrel 23, stem 27 and spring 33 are desirably made of stainless steel.

The splash deflector of the preferred embodiment illustrated herein comprises a plastic barrel or collar 34 of smaller diameter than barrel 23. Collar 34 surrounds the portion of stem 27 and spring 33 adjacent the plunger 25 and is attached to stem 27 to move therewith. Splash deflector collar 34 has an axial extent away from the plunger 25 a distance sufficient so that when the spigot is opened to its FIG. 3 position, the splash deflector 34 will at least partially block drink splash from entering the barrel 23 through the spout opening 24. This is illustrated in FIG. 3 where drink splash 35 has hit collar 34 and has been deflected back into the cup 36, thus to prevent substantial accumulation of drink splash inside the barrel and on the spring 33 and stem 27. Some small amount of splash may, however, collect on the inside wall surfaces of barrel 23 adjacent spout opening 24.

At its end remote from the plunger 25, the deflector collar 34 is provided with a wiper flange 37. Flange 37 is in close proximity to the inside wall of the barrel 23. Accordingly, as the plunger returns from its open FIG. 3 position to its closed FIG. 2 position in the course of shutting off the spigot, flange 37 will wipe along the inner wall of the barrel 23 to wipe any drink splash which has there collected back out through the spout opening 24 and into the cup 36, thus cleaning from the barrel as much drink splash as the wiper flange 37 will remove therefrom.

Accordingly, the splash deflector will block much of the splash from entering the spigot barrel and will remove most of the drink splash that does enter the barrel therefrom and expel it out through the spout opening 24 into the cup 36 in the course of operating the spigot valve.

I claim:

1. In a drink dispenser spigot comprising a barrel, a valve plunger, a stem connected to said plunger for guiding said plunger, a spring arranged around said stem for urging said plunger to a closed position, and a spout opening in a sidewall of the barrel, the improvement comprising a tubular splash deflector in said barrel having at one end an end wall, the other end of said deflector being open, said end wall engaged with said spring and having an aperture for receiving said stem and said deflector having a cylindrical wall defining a hollow interior, said cylindrical wall having a sufficient length to enclose a portion of said spring and obstruct said spout opening thereby partially blocking drink from splashing into the barrel through said spout opening and onto said spring, said splash deflector being mounted upon said stem so as to be wholly movable therewith and including an annular flange wiper at said open end which wipes drink splash from the inside of the barrel and out through the spout opening during actuation of the valve plunger.

2. The improvement of claim 1 wherein said deflector is a separable unit freely carried on said stem.

* * * * *